United States Patent [19]

Grube

[11] Patent Number: 5,446,553
[45] Date of Patent: Aug. 29, 1995

[54] WIRELESS FAX RECEPTION METHOD WITH ROOMING

[75] Inventor: Gary W. Grube, Palatine, Ill.

[73] Assignee: Motorola, Inc., Schaumburg, Ill.

[21] Appl. No.: 913,331

[22] Filed: Jul. 15, 1992

[51] Int. Cl.$^6$ .............. H04N 1/00; H04M 11/00; H04B 1/00
[52] U.S. Cl. .................. 358/402; 358/403; 379/60; 455/54.1
[58] Field of Search ........... 358/400, 402, 403, 407; 379/100, 57, 59, 60; 340/825.44, 825.08; 455/54.1, 54.2, 56.1, 33.4

[56] References Cited

U.S. PATENT DOCUMENTS

| | | | |
|---|---|---|---|
| 4,661,972 | 4/1987 | Kai | 379/57 |
| 4,700,372 | 10/1987 | Bini | 379/60 |
| 4,748,655 | 5/1988 | Thrower et al. | 379/60 |
| 4,775,999 | 10/1988 | Williams | 379/59 |
| 4,833,701 | 5/1989 | Comroe | 379/60 |
| 4,833,702 | 5/1989 | Shitara et al. | 379/60 |
| 4,994,926 | 2/1991 | Gordon | 358/400 |
| 5,109,400 | 4/1992 | Patsiokas et al. | 379/57 |
| 5,243,645 | 9/1993 | Bissell et al. | 379/211 |

FOREIGN PATENT DOCUMENTS

0212761  3/1987  European Pat. Off. .

*Primary Examiner*—Edward L. Coles, Sr.
*Assistant Examiner*—Allan A. Esposo

[57] ABSTRACT

The present invention allows for a communication device (136) which roams within a communication system (100), the ability of maintaining in contact with other communication units, even while the unit is away from its home sub-system. Communication system (100) comprises a wide area paging system which includes a wide area paging controller (184) which controls at least one local area paging controller (108, 182 and 156). When a communication unit is away from its home system, the home system sends out a page via the wide area paging system in order to locate the communication unit and direct the unit to a local sub-system which the unit can use to communicate with the calling unit.

5 Claims, 8 Drawing Sheets

WIRELESS FAX RECEPTION METHOD WITH ROOMING

TECHNICAL FIELD

This invention relates generally to communication systems, and more specifically, to a method of providing communication access to communication devices operating in wide area systems

BACKGROUND

One of the major problems that radio communication systems face when providing wide area two-way data and/or voice communication coverage is how to allow for a communication unit operating in the system to roam freely between sub-systems which form the wide area system. For example, a 10 site simulcast radio frequency trunked system may be considered a wide area two-way system on a regional level. The problem with such systems is how to provide a way of allowing the communication unit which is part of the system the ability to roam freely so that it is always part of a larger composite wide area system (or communication network), thereby allowing a caller to be able to communicate with the communication unit at any time the communication unit is in range of the wide area system.

Present day solutions to the above problem include communication systems such as Coverage Plus ™ manufactured by Motorola, Inc. This system uses a registration process in which the roaming communications units use a "checking in" process on each communication network site as the communication unit moves from site to site. This "check-in" process occurs even if the communication unit is not communicating with other units.

In wide area systems, knowing the location of each of the communication units "ahead of time", before a call request that will involve these units occurs, helps speed up group calls that involve activating channel resources at many sites across the wide area system. Present day registration processes take a lot of time on the site control channel which has the effect of limiting the overall capacity of the local site. The overall effect on system capacity will depend on the number of roaming units and the frequency of operation the units are employing when moving from coverage area to coverage area (i.e., site to site registration "hand-offs"). Currently this is not a major problem with the current numbers of roaming units and the relatively large size of the coverage areas, since typically larger coverage areas see fewer hand-offs. However, as systems become more complex, and coverage areas become smaller in size, system overhead delays will become a major problem for wide area systems.

In wide area trunked systems, communication units must find a site within their present coverage area by either scanning through a list of pre-programmed control channels or they must scan the entire trunking band for a "friendly" control channel that is broadcasting a "networking offered here" message. In other words, the communication unit must search for a control channel which is compatible with the communication unit. As one can quickly determine, acquiring access to a local site, while roaming into unknown coverage areas, in the manner discussed above, is extremely time consuming.

In comparison to wide area trunked systems, cellular telephone systems have relatively small cells and large numbers of communication unit users that only do individual oriented calls (i.e., mobile-to-land and land-to-mobile telephone calls). Given this, cellular systems do not use unit-to-site registration processes. Due to the relative low probability of an infrequent incoming land-to-mobile call, it is better for cellular systems to just send a unit respond signal over the control channel from every cell when incoming calls actually occur. Speed of call set ups is not of utmost criticality for these one unit phone calls. Therefore, the unit respond signals can go out constantly, over a period of several seconds, in order to determine if the communication unit is turned on and in communication range. Each cellular radio must scan the different system control channels as the unit moves from cell to cell.

In nation-wide satellite paging systems, although providing wide area coverage, these systems do not direct roaming communication units to local two-way systems. Also, these paging systems do not provide the pagers with local system availability information in order for the pagers to receive further information once they have been paged.

System to system roaming, like that implemented by Ameritech Inc. in their "Easy Roaming" scheme, uses a roaming unit-to-system registration process as the communication unit enters a non-home system. In this system, the registration process sends a message back to the communication unit's home system so it knows where to forward future calls addressed to the unit, should someone try to reach the roaming unit at its normal home system number. One problem with this roaming arrangement is that calls can only be completed if the unit-to-location information is constantly known. This "back to the home system" registration process suffers when communication units are not able to reach the home system (e.g., RF noise, traffic, etc.). This type of registration process also tends to add a lot of control traffic overhead that may be unnecessary to the wide area system.

More importantly than all of the above mentioned problems is that cellular or trunked communication systems are not presently located everywhere, in order to allow communication units the freedom to roam over wide coverage areas. Presently, communication units are not constructed such that they can use either system type interchangeably. For example, today's cellular radios can't switch over to trunking when a cellular system is not available and a trunked system is, or vice versa. The problem has not been limited by the technology of a radio that has sufficient RF bandwidth to cover both services. The problem arises in that the roaming communication units can't decide which system to move to, even if they could, since the communication units do not know how to find these different types of systems quickly enough and they also do not know which one of the communication systems is "best" for their particular service needs at any given point in time (e.g., data, voice, etc.). This scenario will only worsen as newer small cell systems and other different types of communication systems emerge.

Some more specific systems which deal with communication links establishment in communication systems include systems such as TRACKNET ™ automatic vehicle location system (AVL) manufactured by Motorola, Inc. This AVL system is a mobile to fixed end information gathering system that uses the existing network of U.S. Government Loran-C transmitters to provide vehicle location information. This system can poll units operating in the system via a single mode dedicated radio network. The communication unit responds on this same network with its location. While the Loran-C information is quite accurate, such resolution capability is usually not required when a unit roams outside of its designated home system in many communication system applications. In a lot of communication system applications it is enough to know the approximate vicinity the communication device is located. The problems with such a system is that it requires that the communication devices operating in the system have Loran-C receive capability, as well as being able to receive normal system traffic on another totally different frequency band. Such a requirement is very impractical for portable radios and other smaller communication devices. The need for Loran-C capability also adds a substantial amount of cost to the individual communication devices operating in wide area systems.

In a more specific communication system application, American Telephone and Telegraph Inc., and other corporations are now offering a facsimile (FAX) mail service that operates like the more popular voice mail services which are known in the art. In these systems, the caller dials into the FAX mail system, presumably it would have the same number as the number of the unit being called. If the target unit is roaming, instead of printing the FAX locally, the FAX mail system saves the FAX electronically. When the target unit checks in, the target unit dials the FAX mail system and discovers that there's a FAX pending. The unit then switches to a FAX mode and gets its FAX out of the system. The problem with such a system is that the target unit must still access the FAX machine to receive its FAX. Also, if the target unit is away from its designated home system, the unit will not be able to know that a FAX has arrived for it until it returns to its home system.

As can be seen from the above discussion of prior art systems, a need exists for a way of controlling communication units which operate in communication systems which encompass more than one communication system. A need exists for a wide area system which can provide for improved communication services such as mobile-to-mobile, land-to-mobile, land-to-mobile FAX, land-to-mobile location determination, and other related system features.

DETAILED DESCRIPTION OF THE PREFERRED EMBODIMENT

Figure 1:
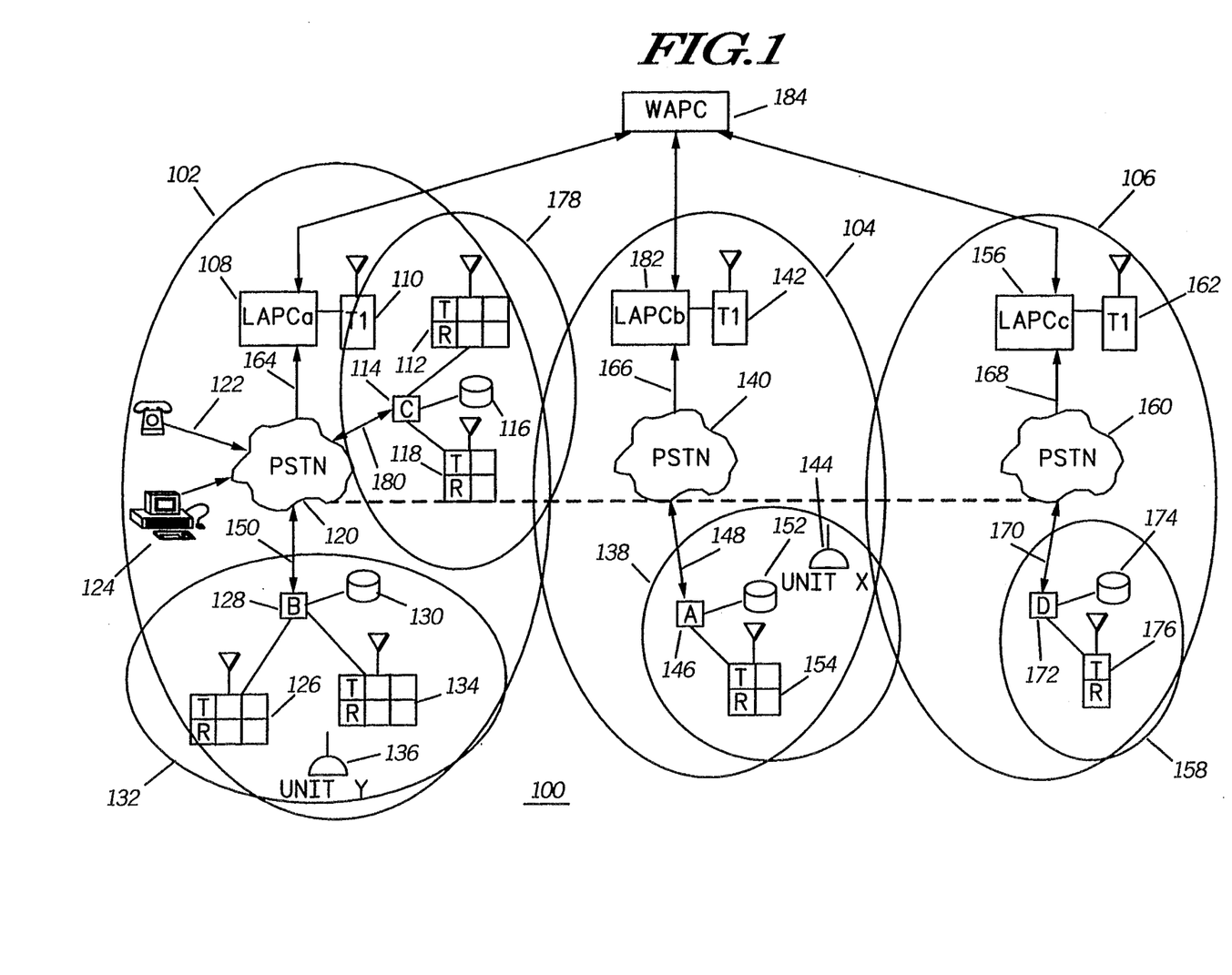
FIG. 1 is a diagram of a wide area communication system in accordance with the present invention.

Referring now to the drawings and in particular to FIG. 1, there is shown a radio communication system 100 in accordance with the present invention. System 100 comprises several two-way communications systems scattered about a wide area coverage area. The diagram shows the communication system comprising sub-systems "A" 138, "B" 132, "C" 178, and "D" 158. Each sub-system having defined communication coverage areas. In most wide area applications, the wide area system 100 will include hundreds of such communication systems. The communication systems 138, 132, 178 and 158 can be comprised of many different types of communication systems, e.g., trunked, cellular, AR-DIS TM, etc. Each individual communication sub-system may have as few as one RF site or as many as the system type (e.g., trunking, etc.) can allow. For example, a trunking communication system may comprise a ten site simulcast regional system.

Each communication sub-system will typically include a sub-system controller such as system controllers 128, 146, 114, and 172 which are responsible for the coordination of their specific communication system. Coupled to each of the central controllers are data bases 116, 130, 152, 174 which store information relating to the units residing in the particular system and other system information. Each system controller is in turn coupled to the public switched telephone network (PSTN, shown as 120, 140 and 160) via appropriate communication links 150, 148, 170 and 180. As shown, each system controller may be in control of one or more communication sites (repeaters). For example, communication system "B" 132 is shown having two sites 126 and 134, system "C" 178 is shown having two sites 112 and 118, system "A" 138 is shown with one site 154, and system "D" 158 is shown having one site 176. Each site or repeater will include a receiver and transmitter as is well known in the art for relaying messages within their appropriate systems.

Each individual communication system 138, 132, 178 and 158 is interfaced to the Public Switched Telephone Network (PSTN) 120, 140 and 160 in order to provide a connection to the paging control system (discussed later) and to land parties that wish to connect to these radio equipped users. System 100 shows two such examples, where a telephone may be used to dial and converse with a target radio unit as shown by telephone 122 and communication unit Y 136 in system 132, or where a computer 124 may be used to dial and connect to a data equipped radio unit. In addition, mobile communication units may initiate a voice or data call and end up using the PSTN to connect to the intended target communication unit roaming on another system. Calling parties will "dial" into the home system where the target unit is normally associated and the present invention will take care of finding the roaming unit and linking the call. This process will be described in more detail later on as well.

Overlaying the entire geography of communication system 100 is a wide area system such as a multi-site same frequency paging system which will serve as a one way (outbound to the field unit) control channel for the communication system. The paging system is comprised of paging coverage areas 102, 104 and 106 which substantially overlap the coverage areas of communication sub-systems 138, 132, 178 and 158. It is constructed with a single transmitter per site 110, 142 and 162, with sites arranged such as to provide a blanket of continuous coverage over the entire wide area service area. Each paging transmitter 110, 142 and 162 is supported by a Local Area Paging Coordinator (LAPC) 108, 182 and 156. The LAPCs job is to format the pages for transmission on its associated paging transmitter and to collect the page requests and other information from the two-way systems in its vicinity.

LAPCs 108, 182 and 156 will support two-way systems in the coverage area of its paging transmitter. While the paging transmitters are depicted as a single transmitter per region, it is also feasible to use multiple paging transmitters in a simulcast fashion to blanket a larger metro region more effectively. Also, instead of using a one-way paging system as described above, one could as easily employ a two-way communication system as the overlapping wide area system.

Each LAPC 108, 182 and 156 is interfaced to the PSTN as well, so that the two-way systems can connect to them in order to update the LAPCs with service availability information, and to locate roaming units when they can't be found their home or local sub-system (systems 132, 138, etc.). The communication device's home sub-system can be either be the sub-system where the communication device is usually located and where most calls to the device are generated, or the sub-system where the calling communication unit is using to locate the communication device. For example, unit X 144 may be attempting to locate unit Y 136 in sub-system 138, thereby making system "A" 138 the home sub-system for unit X 144. Each LAPC is also connected to a Wide Area Paging Coordinator (WAPC) 184 where all the page requests are distributed back out to all the LAPC's. This connection could either be via dedicated line, as shown, or over dial up circuits through the PSTN.

FIG. 1, also shows a field Unit Y 136 in System B 132, and a Unit X 144, in System A. These are included for examples which will be discussed later on, and in practice system 100 could support thousands of these radio units.

Figure 2:
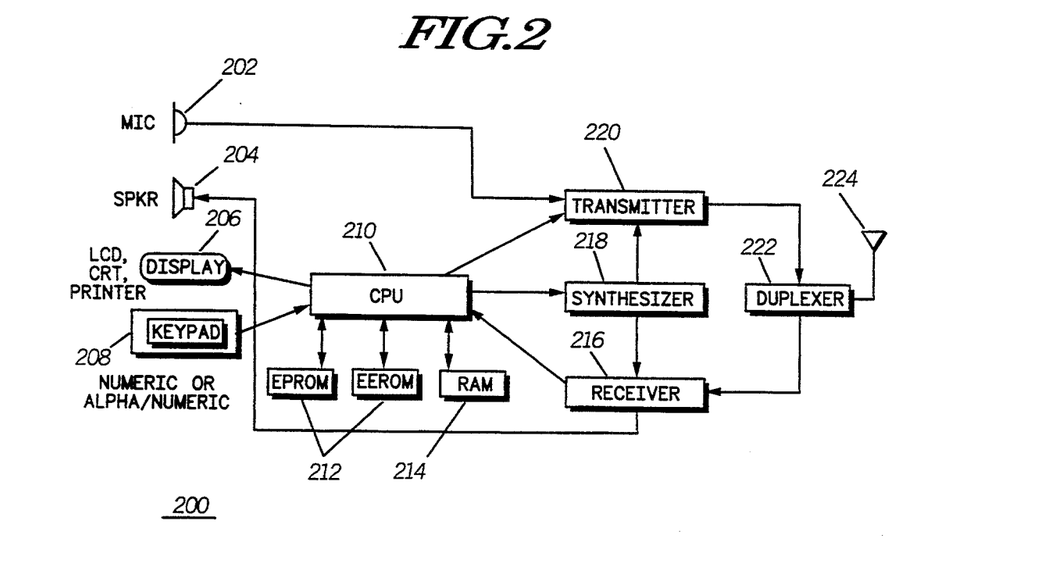
FIG. 2 is a block diagram of a communication unit in accordance with the present invention.

In FIG. 2, a block diagram of a roaming capable communication unit such as a radio 200 in accordance with the present invention is shown. Radio 200 includes a control means such as controller 210, which controls the overall operation of the radio. Controller 210 can be a microprocessor or microcontroller as known in the art. Controller also acts as a decoder means for decoding incoming messages and also determines if radio 200 is operating in its home system. Controller 210 further comprises appropriate control software for performing the overall radio functions. One of such functions performed by controller 210 is a timer means function which produces a signal after radio 200 has been away from it's home sub-system for a predetermined period of time. The signal directs controller 210 to begin looking for a message from the paging system which will direct the radio to an appropriate communication sub-system. The functional aspects of radio 200 will be discussed in more detail later in the description.

Coupled to the controller 210 are electrically erasable read-only memories 212 and random access memory 214, which are used for storage of radio information. Also, coupled to the controller are a keypad 208 for user entry of information, a display 206, and speaker 204. controller 210 is also coupled to synthesizer 218, transmitter 220 and receiver 216. A duplexer 222 controls the flow of information between transmitter 220 and receiver 216 and antenna 224. Radio 200, should preferably have a wide band operation range for both the transmitter and receiver, in order for radio 200 to access multiple system types, such as trunking, cellular, as well as the system wide paging channel.

Figure 3:
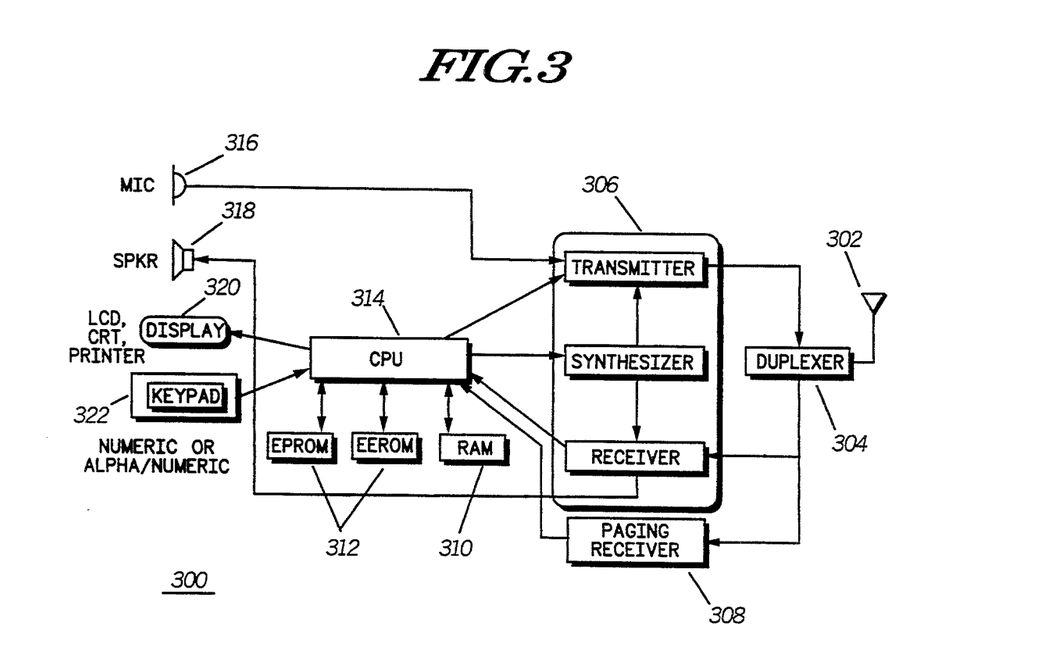
FIG. 3 is a block diagram of a second embodiment of a communication unit in accordance with the present invention.

In FIG. 3, an alternate embodiment of the radio shown in FIG. 2, is shown. Radio 300 instead of using one receiver for both the normal system operation functions and receipt of paging signal functions, uses a separate paging receiver 308 for reception of the system wide paging frequency. Radio 300, also includes a microphone 316, speaker 318, display 320 and keypad 322. Coupled to controller 314 are EEPROM'S 312 and RAM 310. Transceiver portion 306 and paging receiver 308 are coupled to antenna 302 via duplexer 304.

The discussion will know focus on the fixed end infrastructure for the wide area coverage system 100. Since it is the intent of the present invention to have each individual communication system's LAPC 108, 182 and 156 (shown in FIG. 1) decide which local communication system the particular roaming unit should operate on when the communication unit's home system has control information for the unit, the LAPC must have some information to base this on. There are two main sources for this information. One will be the home system, which when it passes along the unit type and call type information to the paging network at the time of the call. This will in turn set the stage for the system requirements information.

For example, the call information might indicate that the roaming communication unit that is going to be paged is a trunking only unit, and the call type is a control transaction since a home based system manager is trying to connect to the communication unit. The LAPC preferably looks into its own database to determine which trunking systems in the communication units area offer control connection service. This leads to the second piece of information that the LAPC needs to make a recommendation on, namely, local system types and their current availability to support various call types.

Figure 4:
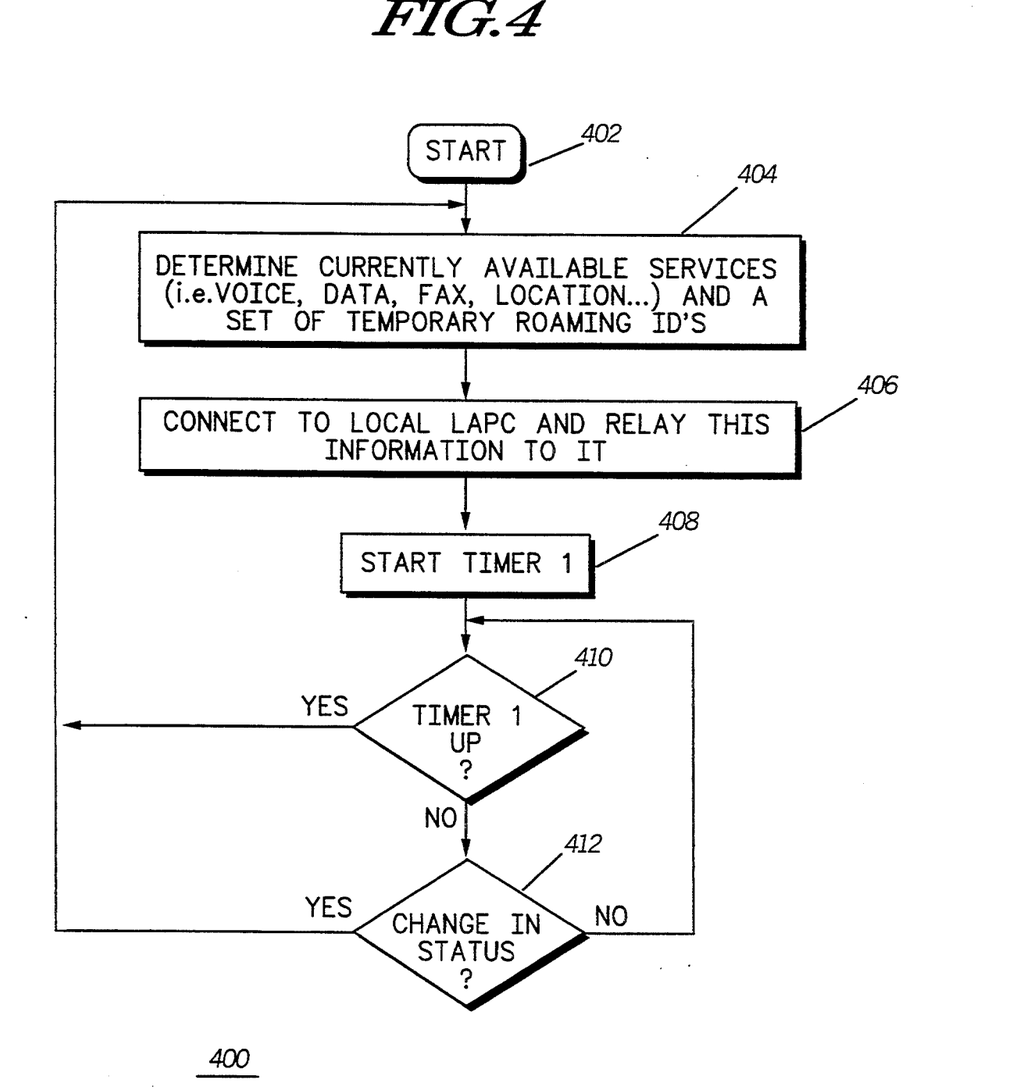
FIG. 4 is a flowchart showing local network service availability reporting in accordance with the present invention.

In FIG. 4, the flowchart shows the steps that a local two-way communication system must carry out in order to provide the above mentioned information to its local LAPC. Firstly, the local system via it's sub-system's central controller (e.g., if the local system is sub-system "A" 138, the sub-system controller would be system controller 146) determines its own list of currently available services such as voice, data, fax, etc., in step 404. Also, and especially for trunking systems, the local system may also determine a pool of roaming ID's for the roaming units to temporary use while the units are in the communication system. When these things are determined, the local communication system will connect to the LAPC as shown in step 406, through the PSTN, and send the information into the specific LAPC database. A timer located in the sub-system controllers (controllers 114, 128, 146, and 172) can then be used to refresh the sub-system's corresponding LAPC database on a periodic basis, to insure correct information, as shown in step 408. In step 412, when service availability changes, an update will be offered right away to the units involved.

Figure 5:
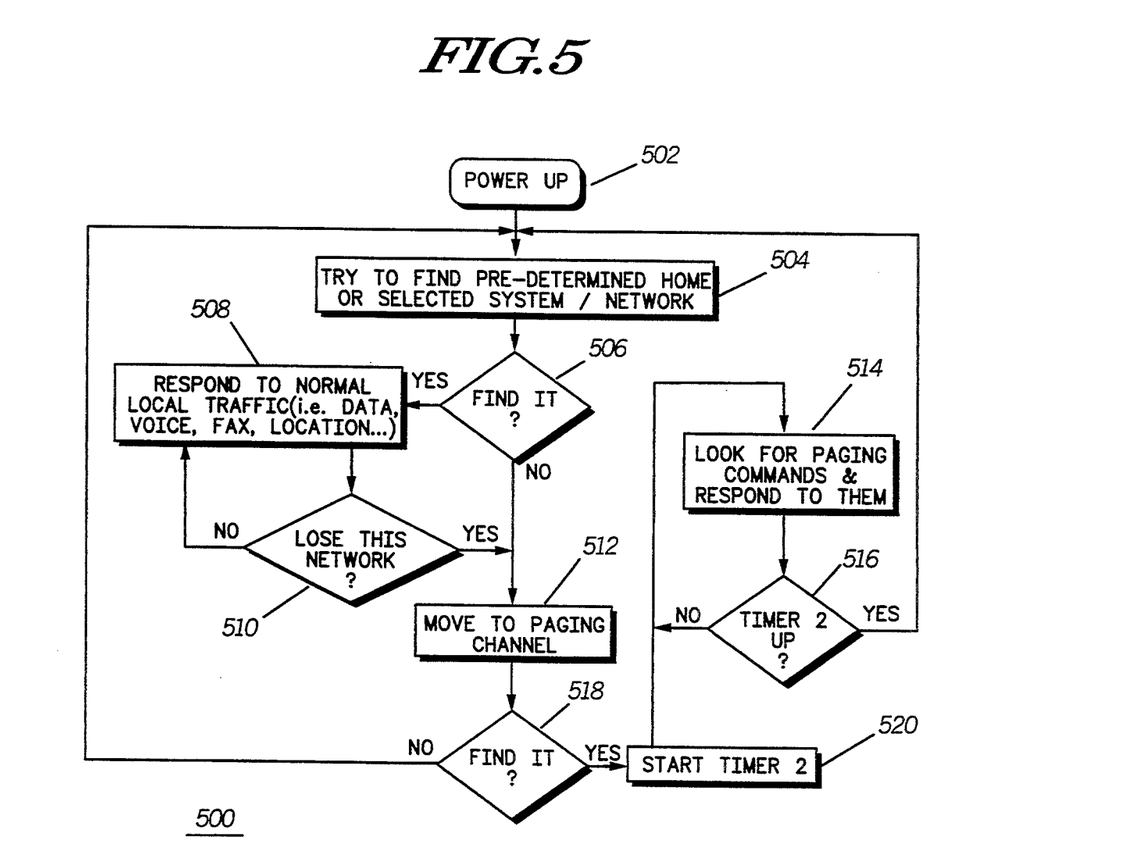
FIG. 5 is a flowchart showing how a communication device can roam out of its designated home system and yet be able to stay in contact via the wide area paging channel.

In FIG. 5, is a flowchart showing how communication device 200 can roam out of its designated home system and yet be able to stay in contact via the wide area paging channel. In step 502, the communication device is turned on. Since in a majority of cases, the unit turns on in its home area, it will start with its usual scan routine to try and find its home system in step 504. The turn-on routine may entail searching a pre-stored list of frequencies for a control channel that is broadcasting the specific home system ID that the communication device is looking for. If the home system is found, the radio will remain in the home system in step 508, operating in a normal fashion where it may be called to respond to incoming data, voice, or other types of calls. The communication device keeps checking the integrity of signaling and quality metrics for its home system in step 510, so that it can judge when it has roamed outside its home system coverage area.

If the communication device roams outside its area, and loses the home system, or if it had powered up outside its home system to begin with, it will try to acquire the paging channel in step 512. If it can't find the paging channel in step 518, the communication device will once again look for its home system. If the paging channel is acquired in step 518, as indicated by receipt of proper paging signaling, the communication device in step 520, will start a timer that will remind the unit to "look back" for its home system every so often (the unit will attempt to receive information on the home system frequency). When the unit is on the paging channel it will try to decode its unique paging channel ID. Every communication device will preferably be assigned a unique paging channel ID that will likely be different than any ID it uses on its home two-way system. If it decodes its ID, it will carry out the command (e.g., "move to cellular system and call home for a data message" in step 514. In step 516, the timer means which is preferably part of controller 210 in FIG. 2, will direct the communication device to attempt to establish communications with it's home system.

Figure 6:
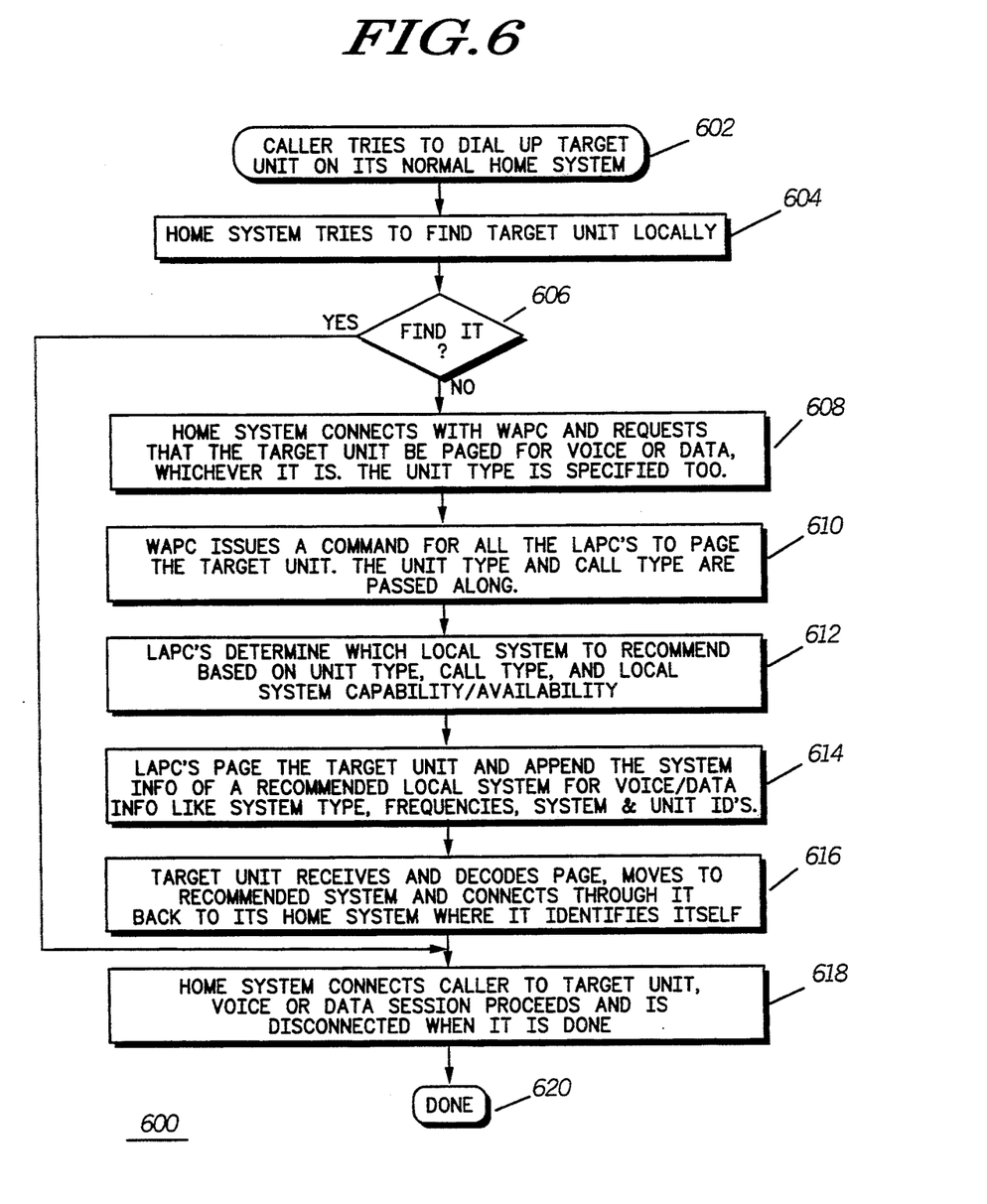
FIG. 6 is a flowchart showing a typical communication system response to a land-to-mobile call in accordance with the present invention.

Referring now to FIG. 6, a typical operation sequence when an actual call is targeted for a roaming communication device is shown. FIG. 6, specifically shows the way system 100 operates in response to an incoming land-to-mobile voice or data call. The intent is to connect a land party voice or data user, to a unit that may be located at home or in another area as it roams in the wide area communication system 100. The land based caller (e.g., a person dialing in to the communication system via a telephone, etc.) will connect to the unit's home system, and wait there until the unit can be connected, or until it has been determined that the unit can not be found, anywhere in system 100.

In step 602, a land-based caller is attempting to dial into the radio unit's home system in order to connect to the target communication device. Referring back to FIG. 1, assuming the caller is computer 124 and the target unit is unit X 144 located away from its home system B 132, over in the coverage area of system A 138. Home system B 132, in step 604, will attempt to find target unit X 144, in the usual fashion in its home system. If the home system is a trunking system, the system will likely have unit-to-site registration information and it will know which system site to initiate a unit poll in to determine if the unit is still on the air. If on the other hand, the home system is a cellular system, it will likely just send a page message out on all of its cells to find the unit. In either case, a short amount of time, in the order of approximately 5 seconds later, the home system (system B 132) will make a determination as to the target unit's location, e.g., at home and turned on, or roaming (or turned off). In this example, Unit X 144 is not located at its home system 132 so the "find it" test of step 606 will fail. Once the unit can't be found at home, in step 608, the home system will connect with the WAPC 184, by way of dialing in through its local LAPC (LAPCa 108), to request that Unit X 144 be paged. The request will contain the paging system ID of the target unit, its capability specification (e.g., cellular only, trunked only, cellular and trunked capable etc.), and the type of service that is required for the call (e.g., data or voice). In step 610, the WAPC 184 simply echoes this request to all of the LAPC's (LAPCa 108, LAPCb 182 and LAPCc 156).

In step 612, each LAPC determines which local system it will recommend should the roamer be found in its area. This is done by each LAPC looking in to its own database of local twoway systems, that are compatible with the roamer and that can currently support the service type requested. In the example, LAPCb 182 will recommend local system A 138, so that unit X 144 can use it to respond to its incoming call.

After the LAPC has determined which system to recommend, in step 614, each LAPC will transmit the page, on each of their respective transmitter(s) (110, 142, 162), in hopes of alerting the roaming unit (unit X 144). The page message will preferably contain the paging system ID of the roamer, the system type of the recommended system, its control access frequencies, its system ID, the call type that the unit is to respond to, i.e. data or voice, and if required a roaming ID that the unit can use to call home.

In step 616, unit X 144 receives the page, from any one of the paging sites, and the roaming unit will then decode the page. The information field of the page will direct the unit to the recommended system (system A 138) where the unit will gain access. Gaining access preferably means generating a call request for the call type specified in the page message. Unit X 144 then dials its home system 132, via the PSTN, where it identifies itself by its normal home system ID. In the example, unit X gains access to System A 138 via system A's central controller 146, where it dials back to its home System B 132.

In step 618, the home system and the target unit are connected and a communication link is established. If the unit had been in the home system area to start with, or if the unit was roaming and dialed back in, the system begins the desired voice or data session, using the communication protocol associated with the unit type (e.g., trunking cellular, etc.) The home system connects the caller to the target unit and the voice or data session continues until it is over. Once the call is terminated, in step 620, the connections through the PSTN are dropped and the resources on the radio system used are de-assigned and returned to the available system pool.

Figure 7:
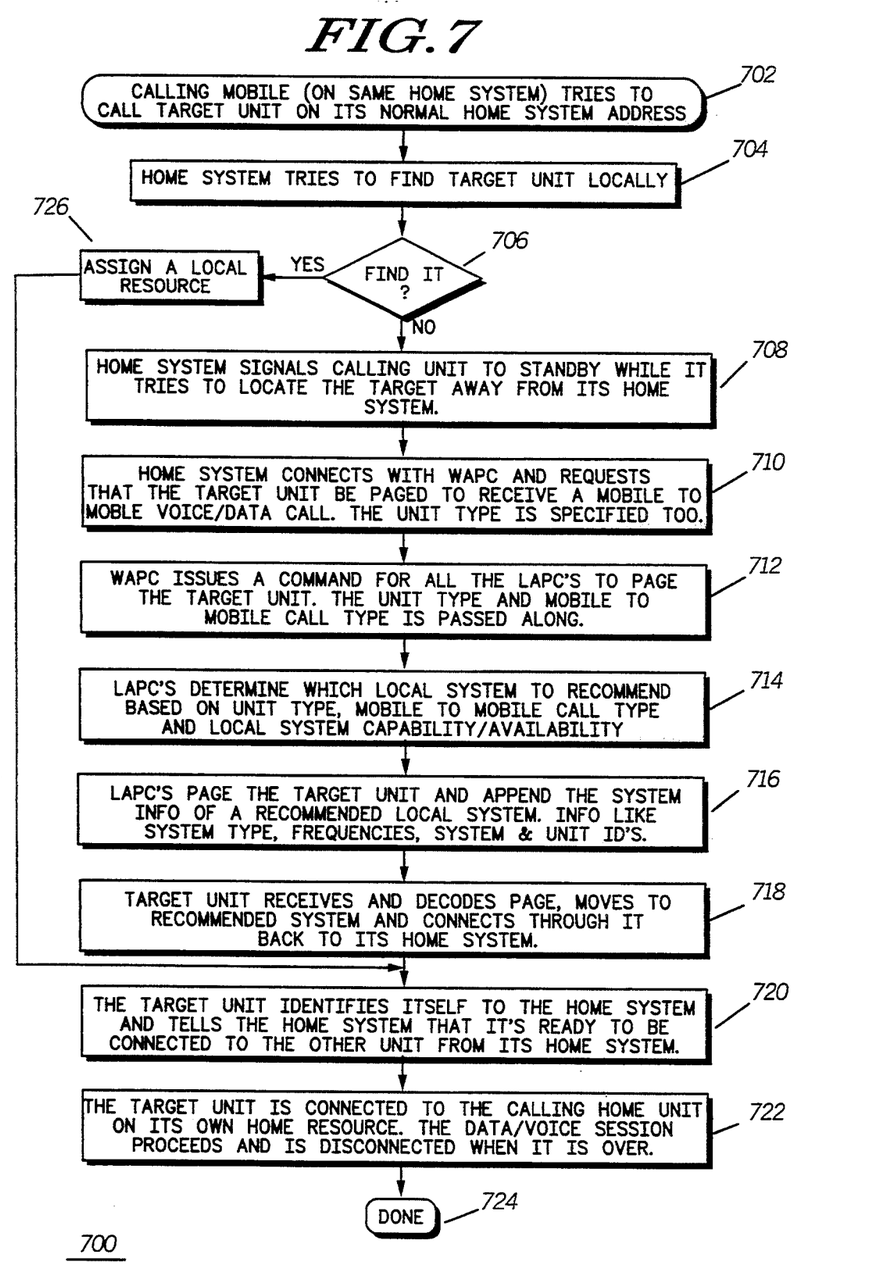
FIG. 7 is a flowchart showing a typical system response to a mobile-to-mobile call in accordance with the present invention.

In FIG. 7, the typical sequence system 100 operates in response to a mobile-to-mobile voice or data request is shown. The intent here is to link a mobile unit (e.g., portable radio, car radio, etc.) on the target's home system to the target unit that may be located in the home system or in another area of system 100. The calling mobile will attempt to contact the target unit as on the unit's home system, and will either be connected right away to the target if the target unit is in its home system, or it will standby while the home system has the target paged in order to connect the target back to the home system.

In step 702, the calling mobile is shown attempting to connect to the target radio unit on the target unit's home system. Referring back to FIG. 1, assuming the calling mobile is unit Y 136 on home system B 132, and the target unit is unit X 144 located away from its home system B 132, in system A 138. Home system B 132, will attempt to find target unit X 144, in the home system. If the home system is a trunking system, it will likely have unit-to-site registration information and it will know which site to initiate a unit location transmission to see if the unit is still within range and operational. If the home system is a cellular system, it will preferably send a page out on all of the systems cells to find the unit. In this example, unit X 144 is not found in its home system so the "find it" test of step 706, will fail.

In step 708, home system B 132, via system controller 128, will inform the calling unit (unit Y 136) to standby while the system attempts to locate the target unit. If unit X 144 is located in home system B 132, the two units will be sent over to a home system channel resource in step 726. For example, if system B 132 is a trunked system, unit X144 and unit Y 136 will be assigned a voice/data channel to communicate with each other by system controller 128.

In step 710, the home system will connect with the WAPC 184, by way of dialing in through its local LAPC, to request that unit X be paged. In this specific example, system B 132 will go through LAPCa 108 to WAPC 184. The request will contain the paging system ID of the target, its capability specification, i.e. cellular only, trunked only, cellular and trunked capable etc., and the type of service that is required for the call (e.g., mobile to mobile voice or data call, etc.). In step 712, WAPC 184 echoes the received request to all of the LAPC's in system 100.

Each of the LAPCs in step 714 determine which local system they will recommend should the roamer be found in their respective communication coverage areas. Again, this is done by each LAPC looking into their own databases of local two-way systems, to locate a compatible system for the call. In the example, LAPCb 182 will recommend local system A 138, so that unit X 144 can use it to respond to its incoming mobile to mobile voice or data call.

After the LAPC has determined which system to recommend, it will transmit the page in step 716, on its transmitter in order to alert the target unit. The page message will preferably contain the paging system ID of the roamer, the system type of the recommended system, its control access frequencies, its system ID, the call type that the unit is to respond to, i.e. mobile to mobile voice or data request, and perhaps a roaming ID that the unit can use to call home.

Receiving this page in step 718, from any one of the paging sites, the roaming unit will decode the page message. The information field of the page will direct the unit to the recommended system where it will gain access. Gaining access means generating a call request for the voice or data response call type specified in the page. The unit then dials its home system in step 718, via the PSTN, where it identifies itself by its normal home system ID. In the example Unit X gains access to System A where it dials back to its home System B.

In step 722, the home system and the target unit are connected. If the unit had been in the home system area to start with, it will be assigned a home system channel resource (e.g., a frequency channel which is available). If the unit was roaming and dialed back in, the unit informs its home system that it's ready to be connected to the calling mobile. The two mobile units are then linked to each other, whereby they proceed with their voice or data session. In step 724, after the units finish the call, the home system and all of the resources are de-assigned.

Figure 8:
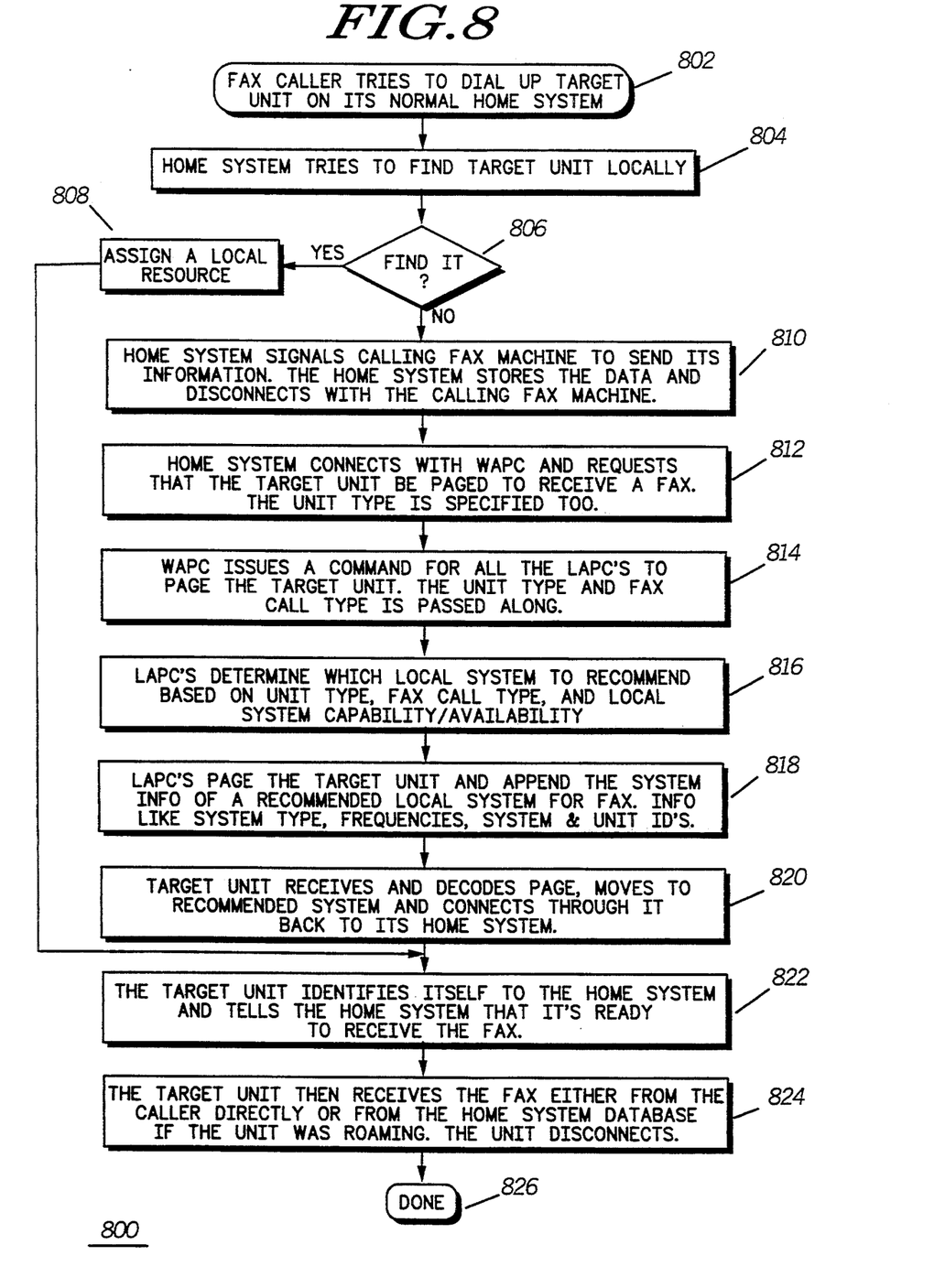
FIG. 8 is a flowchart showing a typical system response to a land-to-mobile FAX request in accordance with the present invention.

Referring to FIG. 8, the flowchart shows how system 100 would preferably handle an incoming land-to-mobile facsimile (FAX) request. The objective here is to connect a land FAX computer, to a unit that may be located at home or in another sub-system in system 100. The calling computer will connect to the unit's home system, and either be connected right away to the target if the target unit is at home, or it will dump the FAX into the unit's home system database for the unit to receive later as soon as the unit can be found elsewhere.

In step 802, a FAX computer or FAX machine is attempting to dial into the radio unit's home system in order to connect to the designated target unit. Referring back to FIG. 1, assume the FAX computer is computer 124, and the target unit is unit X 144 located away from its home system B 132, in system A 138. Home system B 132 like in the previous examples, attempts in step 804, to find unit X 144. In this particular example, unit X 144 is not in its home system, so the "find it" test of step 806 fails. If the target unit is found in the home system, in step 808, the home system assigns a channel resource in order for the two units to establish a communication link.

When the unit can't be found at home, the home system will signal the FAX computer to begin the FAX transmission in step 810. The home system will store the FAX in a home system database 130 and then disconnect from the FAX machine computer 124. Next in step 81 2, home system 132 will connect with the WAPC 184, by way of dialing in through its local LAPC 108, to request that Unit X 144 be paged. The request message will contain the paging system ID of the target, its capability specification, i.e. cellular only, trunked only, cellular and trunked capable etc., and the type of service that is required for the call, like FAX. Then in step 81 4, WAPC 184 simply echoes this request to all of the LAPC's (108, 182 and 156).

In step 816, each LAPC determines which local system it will recommend should the roamer be found in its system coverage area. In the example, LAPCb 182 will recommend local system A 138, so that Unit X 144 can use it to respond to its incoming FAX call.

After the LAPC has determined which system to recommend, it will transmit the page in step 818. Receiving this page in step 820, from any one of the paging sites, the roaming unit will decode the page message. The information field of the page message will direct the unit to the recommended system where it will gain access. Gaining access means generating a call request for the FAX response call type specified in the page. The unit then dials its home system, via the PSTN, where it identifies itself by its normal home system ID. In the example Unit X 144 gains access to system A 138 where it dials back to its home system B 132.

In step 822, the target unit 144 informs the home system to begin sending it the stored FAX message which had been stored in data base 130. In step 824, the target unit receives the FAX. Finally, in step 826, the unit disconnects with the home system and all of the system resources are de-assigned.

Figure 9:
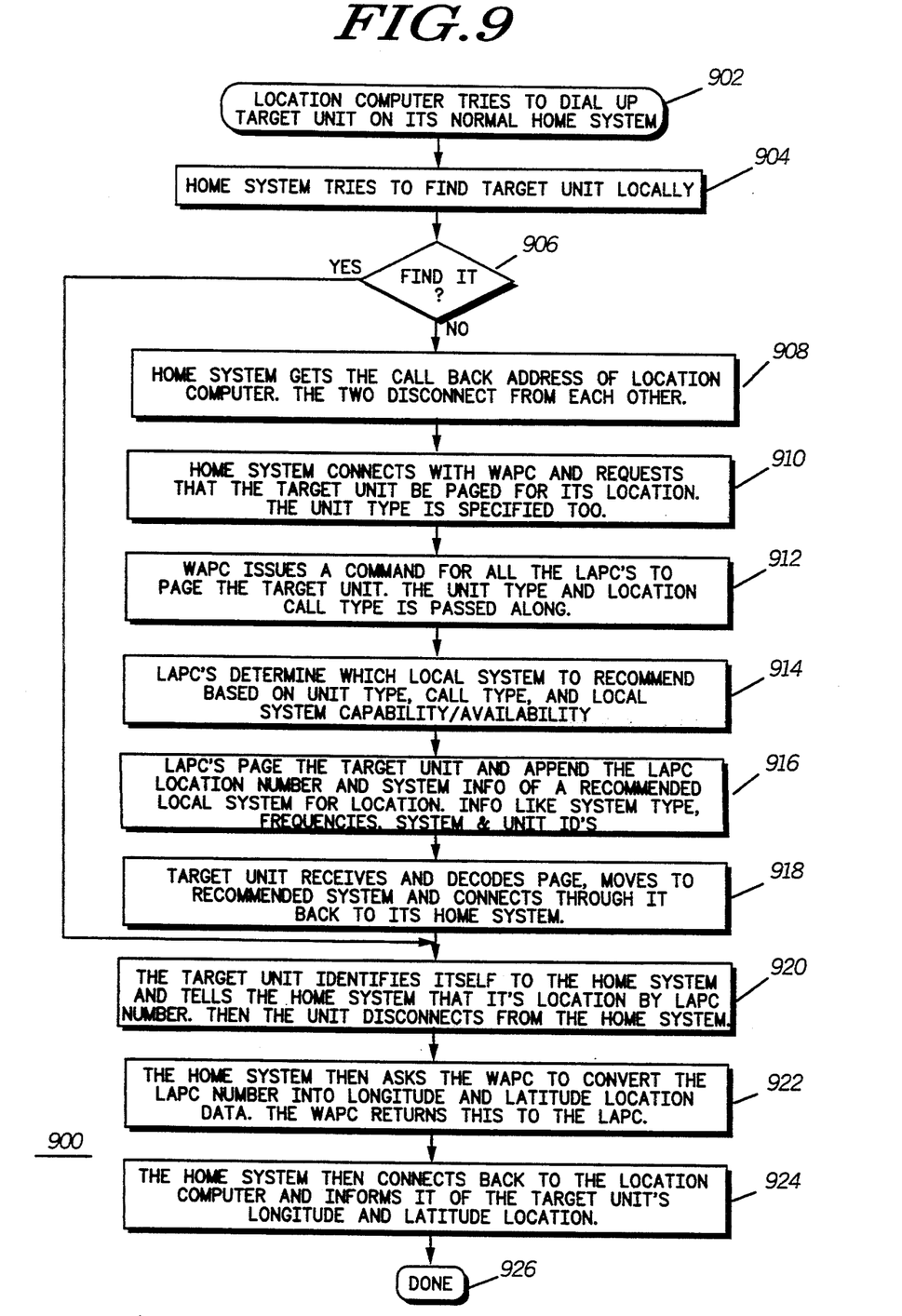
FIG. 9 is a flowchart showing a typical system response to a land-to-mobile location request in accordance with the present invention.

FIG. 9 shows how system 100 operates in response to an incoming land-to-mobile geographic location request. The intent in this sequence is to connect a land location computer to a unit that may be located at home or in another area as it roams. The calling computer will connect to the unit's home system, and either be connected right away to the target if the target unit is in its home sub-system, or it will get a call back as soon as the unit can be found elsewhere.

In step 902, the location computer is shown attempting to dial into the radio unit's normal home system in order to connect to the target unit. Referring again back to FIG. 1, and assuming that the location computer is computer 124, the target unit is unit X 144 and the home system is system B 132, home system 132 in step 904, will attempt to find target unit X 144 first in its home system. In step 906, it is determined that unit X 144 is not located in the home system coverage area.

If the unit can't be found in its designated home system, in step 906, the location computer 124 will leave its call back address (e.g., phone number, or other similar identification information) with the home system 132 in database 130. The communication link is then disconnected in step 908. Next, in step 910, the home system 132 will connect with the WAPC 184, by way of dialing in through its local LAPC (LAPCa 108), to request that unit X 144 be paged. The request will contain the paging system ID of the target, the units capabilities, and the type of service that is required for the call (in this case the call is a location request). In step 912, the WAPC simply echoes this request to all of the LAPC's.

In step 914, each LAPC determines which local system it will recommend should the roamer be found in the sub-systems coverage area. In the example, LAPCb 182 will recommend local system A 138, so that unit X 144 can respond to the incoming call.

After the LAPC has determined which system to recommend, it will transmit the page in step 916. The page message preferably contains information such as: the paging system ID of the roamer, the system type of the recommended system, its control access frequencies, its system ID, the call type that the unit is to respond to (i.e. location request), a roaming ID that the unit can use to call home, and more importantly a LAPCb location identification information field. The location identification field provides data about the geographic location of the LAPC which transmits the message.

Receiving this page in step 918, from any one of the paging sites, the roaming unit will decode the page. Once the page is decoded, the information field of the page message will direct the unit to the recommended system where it will gain access. The unit then dials its home system, via the PSTN, where it identifies itself by its normal home system ID. In this example, unit X 144 gains access to system A 138, which it uses to dial back to its home sub-system B 132.

At this point, home system 132, and target unit 144, have established a communication link. If unit X 144 had been in range of the home system coverage area, to start with, the unit would go to the paging channel to get access to the local LAPC. If the unit was roaming and dialed back in, as in the present example, in step 920, the unit relays its location to the home system in the form of the LAPC ID that it just decoded from the paging message. The unit then disconnects with the home system.

In step 922, the LAPC (LAPCa 108 in this example) requests the WAPC 184 to convert the LAPCa ID into longitude and latitude information. The WAPC could do this by having a database which lists the longitude and latitude of each of the LAPC's by their own unique ID's.

When the home system gets this longitude and latitude information, it connects with the location computer in step 924, from the address that was saved for this unit's location request (there may be several different location computers). It then sends the location information and unit ID to the location computer 124 to complete the transaction. Finally, in step 926, the communication link between the location computer 124 and home system 132 is terminated. In this particular location embodiment, the smaller the sub-system coverage areas and the more LAPCs available, the greater will be the geographic location resolution. In other words, the more accurate will be the longitude and latitude information which is provided. Although longitude and latitude information has been shown in this example, other information that relates location information can be sent as well. For example, the LAPC ID can inform it that it is located in address "X" (e.g., in the corner of Main Street and 2nd Ave., etc.), or other information.

In summary, the present invention provides for improved communication link establishment for communication devices operating in wide area systems which have a plurality of sub-systems. The present invention provides for improved land-to-mobile, mobile-to-mobile, land-to-mobile FAX, land-to-mobile location determination and other communication system features. The present invention automatically transmits a paging message over the wide area system in order to locate the roaming communication device. Once located, the message informs the target unit what sub-system to access in order to establish a communication link with the calling party.

What is claimed is:

1. A method for transmitting a facsimile (FAX) message to a wireless communication device operating in a wireless communication system which includes a plurality of operatively interconnected wireless communication sub-systems each having defined coverage areas, the wireless communication system also having a wide area wireless communication system having a wireless communication coverage area which substantially overlaps the wireless communication coverage areas of the plurality of wireless communication sub-systems, one of the plurality of wireless communication sub-systems being the wireless communication device's home wireless communication sub-system, the method comprising the steps of:

determining if the wireless communication device is located in the wireless communication device's home wireless communication sub-system;

storing the facsimile message in the home wireless communication sub-system if the wireless communication device is not located in the wireless communication device's home wireless communication sub-system;

transmitting a message over the wide area system directed to the wireless communication device if the wireless communication device cannot be found in the wireless communication device's home wireless communication sub-system;

receiving the wide area system message at the wireless communication device;

switching the wireless communication device to operate using one of the plurality of wireless communication sub-systems as directed by the wide area system message in order to establish a wireless communication link with the wireless communication device's home wireless communication sub-system; and receiving the facsimile message at the wireless communication device from the home wireless communication sub-system.

2. A method as defined in claim 1, wherein the step of transmitting a wide area system message comprises paging the wireless communication device.

3. A method as defined in claim 1, further comprising the steps of:

sending a message from the home wireless communication sub-system to the wide area system, the message comprising information regarding the wireless communication device's capabilities and also that a facsimile message has been received for the wireless communication device; and determining at the wide area system which of the plurality of wireless communication sub-systems to recommend to be used by the wireless communication device.

4. A method as defined in claim 1, further comprising the step of:

sending the facsimile message to the wireless communication device without storing the facsimile message if the wireless communication device is located in its home wireless communication sub-system.

5. A method as defined in claim 2, wherein the step of receiving the wide area message at the wireless communication device further comprises the step of:

decoding the wide area message at the wireless communication device in order to determine the wireless communication sub-system from among the plurality of wireless communication sub-systems to use in order to establish a wireless communication link with the home wireless communication sub-system.

* * * * *

UNITED STATES PATENT AND TRADEMARK OFFICE
CERTIFICATE OF CORRECTION

PATENT NO. : 5,446,553
DATED : August 29, 1995
INVENTOR(S) : Gary W. Grube

It is certified that error appears in the above-indentified patent and that said Letters Patent is hereby corrected as shown below:

On the title page, item [54] and column 1:
In the title: "Rooming" should be –Roaming–.

Signed and Sealed this

Twenty-sixth Day of December, 1995

Attest:

BRUCE LEHMAN

*Attesting Officer*                *Commissioner of Patents and Trademarks*